May 7, 1963  C. NUZZO  3,088,259

SADDLE TREE CONSTRUCTION

Filed Aug. 2, 1960

INVENTOR.
CHARLES NUZZO
BY Miketta and Glenny
ATTORNEYS.

United States Patent Office 3,088,259
Patented May 7, 1963

3,088,259
SADDLE TREE CONSTRUCTION
Charles Nuzzo, 2885 W. Valley Blvd., Alhambra, Calif.
Filed Aug. 2, 1960, Ser. No. 46,983
6 Claims. (Cl. 54—44)

The present invention relates to saddle tree constructions and more particularly to saddle tree constructions adapted to be used in riding saddles which are subjected to excessive and rough riding conditions such as in rodeos.

Riding saddles in general include a tree or frame, padding on the undersurface of the tree, skirts attached to the uppersurface of the tree, seat secured on the skirts and other accessories such as a girth, stirrup-straps, and crupper-loop. The saddle tree is the framework of the saddle and primarily determines the quality and sturdiness of the saddle.

A saddle tree comprises a pommel or head which fits over the withers or ridge between the shoulder bones of a horse, a cantle or hind-bow, and side bars interconnecting the pommel and cantle. Heretofore, the elements of a saddle tree were made of wood—beechwood in the better saddles—and secured together by gluing canvas thereon, stretching webbing and leather thongs between elements, nailing and riveting. This provided a saddle tree construction which was heavy and capable of being damaged by the splitting of the wood. Moreover, while saddles and saddle trees made in this manner were satisfactory in the beginning, they did not stand up after rough riding and long usage.

The most common objection was that the pommel and cantle elements of the tree became loose and wobbly on the side bars. This tended to cause the pommel and cantle elements to collapse and the entire saddle to lose its original appearance. Moreover, since the horn was attached to the pommel element, it was dangerous to use the horn as a rope securing post when calves or steers were being roped and the saddle was old or had been used extensively. In addition, the saddle horn was actually ripped from its moorings by sudden jerks or excessive strains.

Accordingly, it is a general object of the present invention to provide a saddle tree construction that avoids all of the foregoing disadvantages of similar type saddle trees used heretofore.

An object of the present invention is to provide a novel riding saddle tree construction which is non-breakable and is capable of long and rough use without elements thereof becoming loose.

Another object is to provide a riding saddle tree construction which is unitary and is extremely lightweight in comparison to saddle trees used heretofore.

Other objects and advantages of this invention will be readily apparent from the following description when considered in connection with the appended drawings.

While there are many different types and styles of riding saddles, they all require a frame or saddle tree on which the other elements of the saddle are attached. The saddle tree must be strong, durable and capable of withstanding severe wear and sudden jerks and pulls. The saddle tree of the present invention is capable of performing all of these functions and may be used as the basic frame in many different types of saddles.

Figure 1:
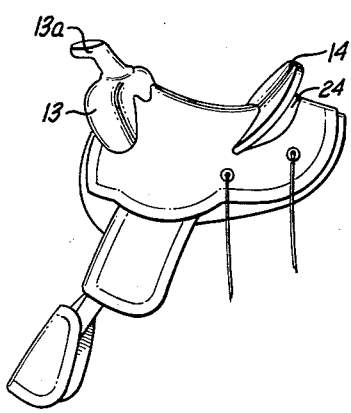
FIG. 1 is a side-top perspective view of a standard, assembled saddle including a saddle tree of the present invention.
Figure 2:
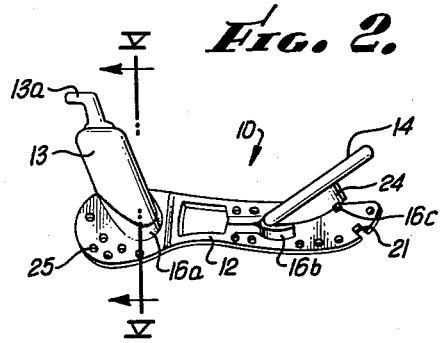
FIG. 2 is a side elevation of an exemplary saddle tree of the present invention.
Figure 3:
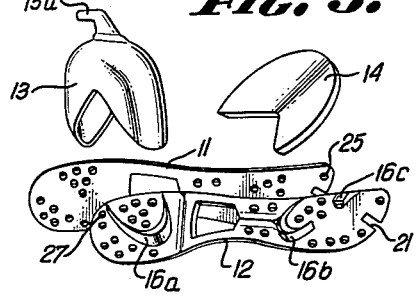
FIG. 3 is an exploded perspective view of the saddle tree of FIG. 2 wherein the pommel and cantle elements are spaced above the side-bar elements in pre-assembled position.
Figure 4:
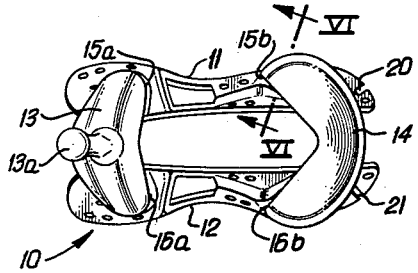
FIG. 4 is a plan of the assembled saddle tree of FIG. 2.

An exemplary saddle tree 10 of the present invention is shown in the drawings and includes a pair of side-bar elements 11 and 12, pommel or head element 13 and cantle or hind-bow element 14. As seen in FIG. 1, the pommel and cantle elements 13 and 14 when assembled in the completed saddle are uncovered and exposed through the saddle and skirt of the saddle.

The side-bar elements 11 and 12 are elongated, spaced and extend in the same direction and include upper and lower surfaces 11a, 11b and 12a, 12b, respectively. The bottom surfaces 11a and 12a of the side-bar elements face and are at an angle with each other so that the distance between the lower edges of the side-bar elements 11 and 12 is greater than the distance between the upper edges of the elements 11 and 12.

The front and rear portions of the side-bar elements 11 and 12 include upstanding integral sockets 15a, 15b, and 16a, 16b, respectively, for receiving the cantle and pommel elements 13 and 14. In plan, the sockets may be U-shaped and may have upstanding retaining walls. The opening of the U-shaped walls of the front sockets 15a and 16a face towards the front portions and upper edges of the side-bar elements 11 and 12, respectively; and the openings of the U-shaped walls of the rear sockets 15b and 16b face towards the rear portions and upper edges of the side-bar elements 11 and 12, respectively.

The side-bar elements 11 and 12 may be slightly curved in transverse section so as to provide a smooth lower surface for the saddle which rests on the horse.

The rear portions of the side-bar elements 11 and 12 may include additional means for supporting and positioning the cantle member 14, such as upstanding seats 15c and 16c, respectively. These seats 15c and 16c are preferably located on the upper edges of the elements 11 and 12 and as will be described hereinafter are used to provide additional support for the cantle and prevents the cantle from collapsing and from being jarred out of its original position. In addition, the rear portions of the side-bar elements 11 and 12 include slots 20 and 21, respectively, opening outwardly on the lower edge thereof for slidingly receiving fastening means (not shown) to secure a skirt element on the side-bar elements.

The pommel element 13 is preferably hollow and may be provided with an integral horn 13a. The pommel element extends between the side-bar elements and has lower end portions positioned within the walls of the front sockets 15a and 16a on the elements 11 and 12.

Figure 5:
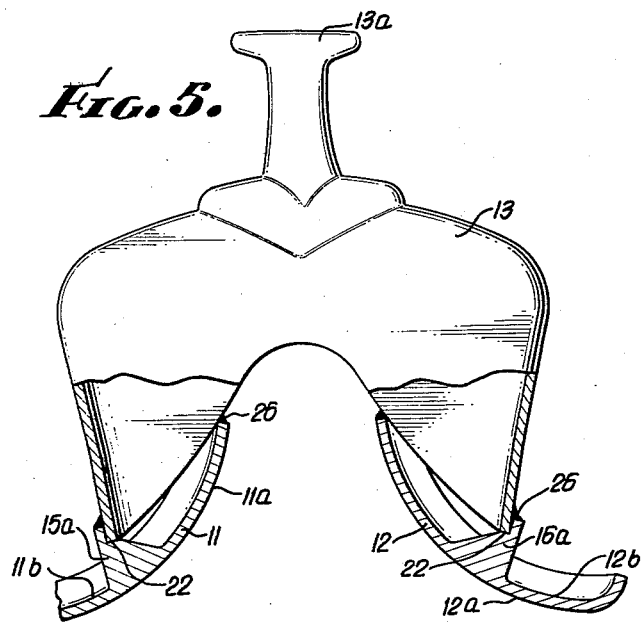
FIG. 5 is an enlarged transverse section of the device taken along plane V—V of FIG. 2.

As best seen in FIG. 5, the sockets 15a and 16a are provided with ledges or stop shoulders 22. The lower ends of the pommel elements rest on the shoulders 22 and are shaped to snugly engage the inner sides of the walls of the sockets 15a and 16a. The upper edges of the side-bar elements 11 and 12 may engage and support the inner edges of the pommel element 13.

Figure 6:
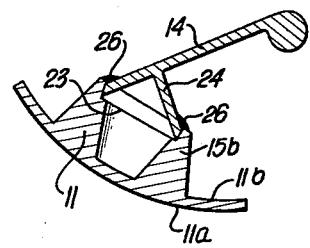
FIG. 6 is an enlarged transverse section of the device taken along plane VI—VI of FIG. 4.

The cantle element 14 extends between the side-bar elements 11 and 12 and has lower end portions positioned within the walls of the rear sockets 15b and 16b on the elements 11 and 12. As seen in FIG. 6, ledges or stop shoulders 23 are provided within the rear sockets 15b and 16b for receiving and supporting the lower end portions of the cantle element 14.

The front surface of the cantle element 14 is adapted to form the rear part of the seat of the saddle and the rear surface of the cantle element 14 is provided with a downwardly and rearwardly extending supporting and positioning flange 24. The outer portions of the flange 24 are adapted to be received in the rear sockets 15b and 16b and the mid-portions thereof are adapted to be received and supported in the seats 15c and 16c on the rear portions of elements 11 and 12. The flange 24 is of sufficient width and shape, and the seats 15c and 16c are properly located so as to position the front surface of the cantle element 14 at the proper angle with respect to the seat of the saddle.

It is therefore seen that the pommel and cantle elements are received in the sockets provided on the side bars and may be assembled into a completed unitary saddle tree by rigidly securing the elements together.

With the saddle tree construction of the present invention, metal such as aluminum may be used for the elements thereof, although other materials may be utilized. The elements may be made by casting for production purposes, and may be stripped of excess material for lightness by making the pommel element 13 hollow and by boring holes such as 25 through the side-bar elements 11 and 12. If aluminum is used for the elements, they may be welded together by means of a heli-arc process in which the welding is performed in an atmosphere of helium in order to achieve the best results. Welding material 26 is shown in the drawings for rigidly securing the pommel and cantle elements within the sockets 15a, 15b, 16a, 16b and seats 15c, 16c on the elements 11 and 12. It is understood that other means may be used to rigidly connect the elements together.

It is therefore obvious that the saddle tree of the present invetnion is lightweight, is of unitary construction and is non-breakable. The horn 13a is preferably integral with the pommel element 13 and forms a rigid securing post for ropes or the like. When the cantle element 14 is rigidly secured in the rear sockets 15b and 16b on the elements, it is not susceptible of being jarred loose or collapsing from excessive use. The sockets on the side-bar elements provide a rigid connection for the cantle and pommel elements and aid in providing a unitary construction.

It is understood that the saddle tree 10 of the present invention may be provided with the usual equipment that is provided on a saddle such as padding, skirts, seat, girth, stirrup-straps and crupper-loop. These elements have purposely not been discussed in detail as they form no part of the present invention. However, it is understood that the leather skirts and soft padding may be secured to the side bar elements by means of bolts or other fastening devices received in openings 27 in the side bar elements.

A saddle tree of the present invention is particularly well suited for use in rodeo work where the cantle and pommel elements are constantly being torn loose. Moreover, the horn which is used as a rope securing post is frequently uprooted from the pommel element. None of these disadvantages are present in the saddle tree of this invention. A saddle tree of the present invention will not require any repairs and will have a longer life than any known saddle tree. The horn, cantle and pommel elements are not capable of becoming disassembled from the side-bar elements through normal use.

Obviously, many modifications and variations of the present invention are possible in the light of the above teachings. It is therefore to be understood that within the scope of the appended claims the invention may be practiced otherwise than as specifically described.

I claim:

1. In a non-breakable, lightweight saddle construction, a saddle tree including, a pair of spaced, elongated, metal side-bar elements extending in the same direction and having top and bottom surfaces, said bottom surfaces facing and being at an angle with each other so that the distance between the lower edges of said side-bar elements is greater than the distance between the upper edges of said side-bar elements, the front and rear portions of said side-bar element having upstanding integral sockets adapted to receive cantle and pommel elements, said sockets on the front and rear portions of said side-bar elements having substantially U-shaped upstanding retaining walls in plan, the openings of said front U-shaped socket walls facing towards the front portions and upper edges of said side-bar elements, the openings of said rear U-shaped socket walls facing towards the rear portions and upper edges of said side-bar elements, a metal pommel element extending between said side-bar elements and having end portions positioned within said walls of said front sockets on said side-bar elements, a metal cantle element extending between said side-bar elements and having end portions positioned within said walls of said rear sockets on said side-bar elements, and means for rigidly connecting said pommel and cantle elements within said sockets whereby a unitary saddle tree is provided.

2. In a saddle tree as stated in claim 1, wherein said cantle element includes front and rear surfaces and said rear surface is provided with a downwardly and rearwardly extending supporting and positioning flange, said rear portions of said side-bar elements including upstanding seats for receiving said supporting and positioning flange, and means for rigidly connecting said flange within said seats.

3. In a saddle tree as stated in claim 1, wherein said side-bar, pommel and cantle elements are made of cast aluminum and are welded together to provide a lightweight, unitary and non-breakable construction.

4. In a non-breakable, lightweight saddle construction, a saddle tree including, a pair of spaced, elongated side-bar elements extending in the same direction and having top and bottom surfaces, said bottom surfaces facing and being at an angle with each other so that the distance between the lower edges of said side-bar elements is greater than the distance between the upper edges of said side-bar elements, the front and rear portions of said side-bar elements having upstanding integral sockets adapted to receive cantle and pommel elements, a pommel element extending between said side-bar elements and having end portions positioned within said front sockets on said side-bar elements, a cantle element extending between said side-bar elements and having end portions positioned within said rear sockets on said side-bar elements, said cantle element including front and rear surfaces, said rear surface having a downwardly and rearwardly extending supporting and positioning flange, said rear portions of said side-bar elements having upstanding seats for receiving said supporting and positioning flange, means for rigidly connecting said flange within said seats, and means for rigidly connecting said pommel and cantle elements within said sockets whereby a unitary saddle tree is provided.

5. In a non-breakable, lightweight saddle construction, a saddle tree including, spaced, elongated side-bar elements extending in the same direction and having top and bottom surfaces, said bottom surfaces facing and being at an angle with each other so that the distance between the lower edges of said side-bar elements is greater than the distance between the upper edges of said side-bar elements, the front portions of said side-bar elements having upstanding, integral sockets adapted to receive a pommel element, said sockets including substantially U-shaped, upstanding retaining walls in plan and the openings of each U-shaped socket facing towards the front portions and upper edges of said side-bar elements, a pommel element extending between said side-bar elements and having end portions positioned within said sockets in said side-bar elements, and means for rigidly connecting said pommel element within said sockets whereby a unitary saddle tree is provided.

6. In a saddle tree as stated in claim 5, wherein said side-bars and pommel element are made of cast aluminum and are welded together to provide a lightweight, unitary and non-breakable construction.

References Cited in the file of this patent
UNITED STATES PATENTS

| | | |
|---|---|---|
| 645,863 | Loeloff | Mar. 20, 1900 |
| 1,212,545 | Nickel | Jan. 16, 1917 |
| 2,037,275 | Senderman | Apr. 14, 1936 |